April 22, 1941.  W. R. LLOYD  2,239,046
SCOOP FOR ICE CREAM AND THE LIKE
Filed March 25, 1940
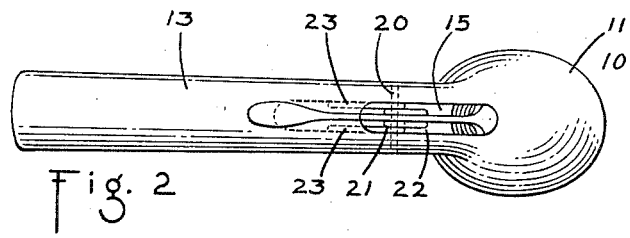
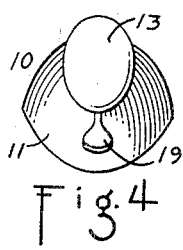 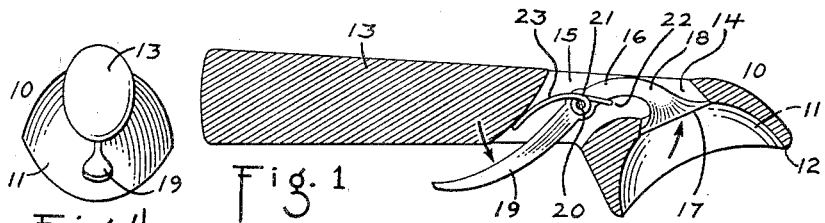
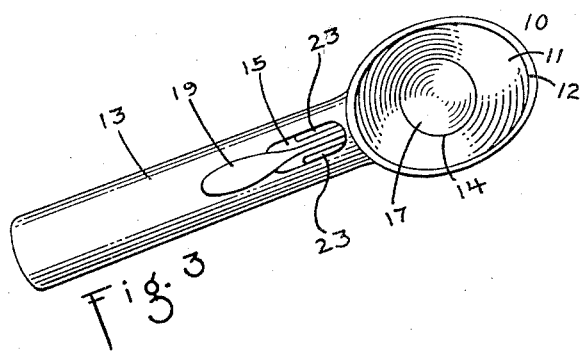
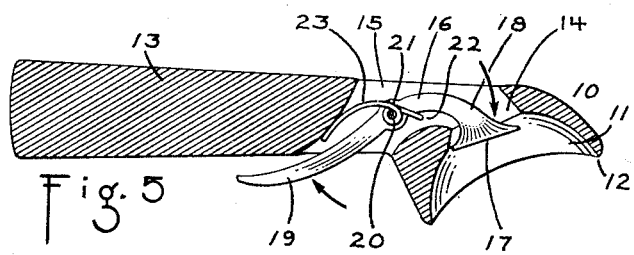
WALTER ROSS LLOYD
INVENTOR
BY G. Lorenze Miller
ATTORNEY Patented Apr. 22, 1941

2,239,046

UNITED STATES PATENT OFFICE 2,239,046

SCOOP FOR ICE CREAM AND THE LIKE

Walter Ross Lloyd, Decatur, Ill.

Application March 25, 1940, Serial No. 325,733

4 Claims. (Cl. 107—48)

This invention relates to dippers or scoops for ice cream and the like, and particularly to such devices which are adapted for use in serving measured quantities of ice cream and the like to individual customers.

More specifically, my invention relates to scoops of the class mentioned in which provision is made for ejecting a measured quantity of the confection into a receptacle to be served.

One of the principal objects of my invention is to provide a scoop for ice cream and the like having a manually operable ejector which will form a part of the bowl of the scoop, and which may be conveniently operated by the thumb of the user.

Another object of my invention is to provide a scoop of the class mentioned in which an effective cutting edge is formed about the rim of the bowl.

A still further object of my invention is to provide a scoop for the purpose mentioned, having few parts, which may easily be cleansed, and of such simple and inexpensive construction as to enable confectioners to keep a liberal supply of scoops in service.

Further objects and advantages of my invention will appear from the following specification and the accompanying drawing forming a part thereof.

In the drawing:

Fig. 1 is a longitudinal cross-sectional view of my improved scoop;

Fig. 2 is a bottom plan view;

Fig. 3 is a top plan view;

Fig. 4 is an end view; and

Fig. 5 is a cross-sectional view similar to Fig. 1, but in inverted position for ejection of material.

Referring to the drawing by numerals, in which like numerals indicate like parts in the several views, 10 is the scoop having a suitable bowl 11 in which the rim has formed thereon a cutting edge 12 which coincides with the interior wall of the bowl to facilitate the cutting of frozen substance such as ice cream, water ice and similar confections. Formed integrally with the bowl 11 is a handle 13, which is preferably of oval shape in transverse cross-section, as shown in the end view of Fig. 4. An opening 14 in the bottom of the bowl 11 merges into a slot 15 which extends through the handle 13.

Mounted in slot 14 is an ejector device 16 comprising a disc-like portion 17 which fits within opening 14, a curved neck portion 18 which curves outwardly toward the back of handle 13, and diagonally downward through slot 15 and merging into a lever portion 19, which is curved outwardly and backwardly toward the front of handle 13 to provide means for manipulating the ejector.

A pin 20 extending transversely through handle 13 and ejector 16 secures the latter in slot 15 so that the ejector may have free, pivotal, movements, a coil spring 21 has a loop 22 engaging the inner edge of neck portion 18, and its free ends 23 engaging the rear wall of slot 15, thus causing spring 21 to exert force in the direction of the arrows shown in Fig. 1 to normally hold disc 17 against the edge of opening 14.

When it is desired to use the scoop 10, the handle 13 is grasped in the hand with the thumb adjacent the ejector lever 19, but not engaging it. The scoop is then forced into the mass of ice cream or similar substance and the cutting edge 12 will facilitate the flow of the cream into bowl 11. The quantity of cream is then ejected into a dish, a cone or other receptacle for individual serving, by pressing lever 19, and causing disc 17 to move outwardly of opening 14 as shown in Fig. 5.

The scoop may then be thoroughly cleansed by dipping it into a dipper of water, and it can be sterilized by dipping it in scalding water.

Although my improved scoop is preferably cast or otherwise formed from a light weight metal such as aluminum, it may be formed of vitreous or plastic material.

From the foregoing description it will be seen that my improved scoop is made of relatively few, inexpensive parts, which are so assembled as to render them easily kept in a clean and sanitary condition.

It is to be understood that modifications of my improved scoop may be made within the scope of the following claims without departing from the spirit of the invention.

Having described my invention, I claim:

1. A scoop for ice cream and the like having an open bowl with a cutting edge formed about its rim, and a handle extending outwardly from said bowl, a central opening in the bottom of said bowl merging into an open slot extending transversely through said handle, an ejector pivotally mounted in said slot and having one end thereof terminating in an enlarged closure disc for said central opening and its other end terminating in a lever for forcing said disc outwardly away from said opening, and spring means engaging said ejector and said handle for normally holding said disc in closed position over said opening.

2. A scoop for ice cream and the like having an open bowl with a cutting edge formed about its rim and a handle extending outwardly from said bowl, a central opening in the bottom of said bowl merging into an open slot extending transversely through said handle, an ejector pivotally mounted in said slot and having one end thereof terminating in an enlarged closure disc for said central opening and its other end terminating in a lever for forcing said disc outwardly away from said opening, said lever being disposed in substantially parallel relation with the face of said disc, and being adapted to be depressed toward said handle to move said disc in the opposite direction, and spring means engaging said ejector and said handle for normally holding said disc in closed position over said opening.

3. A scoop for ice cream and the like having an open bowl with a cutting edge formed about its rim and a handle extending outwardly from said bowl, a central opening in the bottom of said bowl and merging into an open slot extending transversely through said handle, a substantially S-shaped ejector pivotally mounted in said slot and having one end terminating in an enlarged closure disc for said central opening and its other end terminating in a lever adapted to be depressed toward said handle for forcing said disc outwardly away from said opening, and spring means engaging said ejector and said handle for normally holding said disc in closed position over said opening.

4. A scoop for ice cream and the like having an open bowl with a cutting edge formed about its rim and a handle extending at substantially a right angle from said bowl, a central opening in the bottom of said bowl merging into an open slot extending transversely through said handle, a substantially S-shaped ejector mounted in said slot and having one end terminating in an enlarged closure disc for said central opening and its other end terminating in a lever adapted to be depressed toward said handle for forcing said disc outwardly away from said opening, a pivot pin extending transversely through said ejector into said handle, a substantially U-shaped wire spring having its closed end engaging the forward portion of said ejector, and its free ends engaging the rear end of said slot, said spring being coiled once about said pin on each side of said ejector, said spring being for the purpose of normally holding said disc in closed position against said central opening.

WALTER ROSS LLOYD.